United States Patent Office 3,674,505
Patented July 4, 1972

3,674,505
PROCESS FOR MANUFACTURING INSTANT
HAMBURGER STEAK
Yuichi Shinkawa, 21-8, 3-chome, Tsukishima,
Chuo-ku, Tokyo, Japan
No Drawing. Continuation-in-part of application Ser. No.
687,483, Dec. 4, 1967. This application Jan. 11, 1971,
Ser. No. 105,624
Int. Cl. A22c 18/00
U.S. Cl. 99—108            3 Claims

ABSTRACT OF THE DISCLOSURE

A process for manufacturing an instant hamburger steak which comprises kneading meats and vegetables with starch, flavoring the kneaded hamburger material with seasoning and spices, immersing the flavored material in hot edible oil for a suitable period to effectuate a preliminary cooking, taking the material out of the edible oil to permit cooling and instantaneously dipping the cooled material into molten fat so as to form a film of fat in solid state around the whole surface of the hamburger steak. Alternatively, the preliminary cooking can be effected by steaming, or by steaming followed by immersion in hot cooking oil.

---

This application is a continuation-in-part of my copending application Ser. No. 687,483, filed Dec. 4, 1967 and now abandoned.

This invention relates to a process for manufacturing an instant hamburger steak which is preservable in the atmosphere for a long time with a fresh flavor and which may be prepared quickly for eating by a short heating without requiring any ordinary cooking operation.

Heretofore, various kinds of instant hamburger steaks have been proposed. However, the flavor thereof deteriorates during the preservation and accordingly it is impossible to maintain freshness of flavor for a long time.

It is thus a principal object of the invention to obviate the above disadvantages and to provide a new process for manufacturing an instant hamburger steak which is preservable in the atmosphere for a long time with a fresh flavor.

It is another object of this invention to provide a new process for manufacturing an instant hamburger steak which is subjected to a preliminary heat treatment at a lower temperature to permit rapid preparation for eating by a final short heat treatment.

In one embodiment of this invention, the hamburger meat and vegetables are kneaded with starch and then flavored with seasoning and spices. The flavored material is shaped into a suitable form and then dipped in edible oil heated at temperature of from 60° C. to 100° C. for a preferred period to effectuate the preliminary cooking. The hamburger material after being taken out of the edible oil is further instantaneously immersed in molten fat so as to form a film of fat in solid state on the whole surface of the hamburger steak.

In another embodiment of this invention, the hamburger material shaped into a suitable form is steamed at a temperature of approximately 100° C. for a predetermined period to effectuate the preliminary cooking.

In a further embodiment of the invention, the hamburger material is steamed at a temperature of approximately 100° C. for 15 minutes to effectuate the preliminary cooking. The steamed hamburger material is further dipped in edible oil heated at 150° C. for from 30 seconds to two minutes in order to evaporate moisture that impregnated the hamburger material during the steaming step.

The minimum cooking times at various temperatures are thus:

60° C.—about 25 minutes
70° C.—about 20 minutes
80° C.—about 15 minutes
90° C.—about 12 minutes
100° C.—about 10 minutes Without limiting this invention, the following examples are given to illustrate possible preferred modes of operation.

EXAMPLE I

Five kg. of mixed mince of beef or pork and other meats and 1 kg. of onion cut in pieces are kneaded with 200 g. of flour, which is then flavored with 100 g. of salt and a small amount of pepper and a 100 g. mass of the mixture is separated and shaped into a suitable form. The shaped hamburger material is dipped in lard having a melting point of 32° C. and heated to 85° C. for 30 minutes and then taken out of the lard to allow cooling for approximately 20 minutes to room temperature and thereafter instantaneously immersed in molten fat of about 45° C. to form a film of the fat in solid state around the whole surface of the hamburger steak.

EXAMPLE II

Five kg. of mixed mince of beef or pork and other meats and 1 kg. of onion cut in pieces are kneaded with 200 g. of flour, which is then flavored with 100 g. of salt and a small amount of pepper, and a 100 g. mass of the mixture is separated and shaped into a suitable form. The shaped hamburger material is steamed at a temperature of approximately 100° C. for about 15 minutes and then taken out of the steaming chamber to allow cooling for 20 minutes to room temperature, and thereafter instantaneously dipped into molten tallow or beef fat having a melting point of 42° C. and at a temperature of 45° C. to form a film of fat in the solid state around the whole surface of the hamburger steak. Tallow is preferred to lard on account of its taste.

EXAMPLE III

Five kg. of mixed mince of beef or pork with other meats and 1 kg. of onion cut in pieces are kneaded with 200 g. of flour, which is then flavored with 100 g. of salt and a small amount of pepper and a mass of the mixture in 100 g. is separated and shaped into a suitable form. The shaped hamburger material is steamed at a temperature of approximately 100°C. for about 15 minutes and dipped in edible oil of approximately 150° C. for from 30 seconds to two minutes and thereafter taken out of the edible oil to allow cooling for approximately 20 minutes to room temperature. The resultant material is instantaneously dipped once again in molten fat of 45° C. to form a film of fat in solid state around the whole surface of the hamburger steak.

To prepare for eating, the instant hamburger steak is heated in a frying pan, for example, at a high temperature such as 150° C. for a short period to sear the surface of the hamburger steak to a proper extent.

According to this invention, the raw material of the hamburger steak is treated with the edible oil heated to a low temperature of from 60° C. to 100° C. to effectuate the preliminary cooking so that any loss of ingredient may be held to a minimum without losing freshness of flavor.

In the cooling process, after taking the hamburger material out of the edible oil, the said edible oil coagulates to form an oil film around the whole surface of the raw material of the hamburger steak, which makes the said raw material of the hamburger steak airtight thereby maintaining freshness of flavor.

Further, since the raw material of the hamburger steak is instantaneously immersed in the molten fat to form an additional film of fat in solid state around the whole surface thereof, the hamburger steak is preservable for a long time and any change in flavor and color is effectively prevented.

Moreover, in the final preparation of the hamburger steak for eating, the film of fat which coats the surface of the said hamburger steak is molten by heat, so that any lubrication of the frying pan with oil is not required thereby simplifying the cooking operation.

It will be understood that the invention is not to be limited to the exact examples described, but that various changes and modifications may be made without departing from the spirit and scope of the invention, as defined in the appended claims.

Having described my invention, I claim:

1. A process for manufacturing an instant hamburger steak which consists of kneading meats and vegetables with starch, flavoring the kneaded hamburger material with seasoning and spices, shaping the hamburger material, heating the shaped material at about 100° C. for about 10 minutes to effectuate a preliminary cooking, cooling the material to about room temperature, and thereafter instantaneously dipping the cooled material into molten fat having a temperature of about 45° C. so as to form a film of fat in solid state around the whole surface of the hamburger steak.

2. A process as claimed in claim 1, in which said heating is performed for about 15 minutes.

3. A process as claimed in claim 2, in which said heating is performed by steaming the hamburger material.

References Cited

UNITED STATES PATENTS

| | | | |
|---|---|---|---|
| 1,007,908 | 11/1911 | Ahrens | 99—169 |
| 2,584,584 | 2/1952 | Hoffman et al. | 99—107 X |
| 2,798,814 | 7/1957 | Rivoche | 99—107 X |
| 2,819,975 | 1/1958 | Letney | 99—169 |
| 3,169,069 | 2/1965 | Hanson et al. | 99—108 X |

HYMAN LORD, Primary Examiner